(12) United States Patent
Zhang et al.

(10) Patent No.: US 9,660,290 B2
(45) Date of Patent: May 23, 2017

(54) OXIDATION RESISTANT SEPARATOR FOR A BATTERY

(75) Inventors: Zhengming Zhang, Charlotte, NC (US); Pankaj Arora, Chesterfield, VA (US)

(73) Assignee: Celgard, LLC, Charlotte, NC (US)

( * ) Notice: Subject to any disclaimer, the term of this patent is extended or adjusted under 35 U.S.C. 154(b) by 659 days.

(21) Appl. No.: 11/549,273

(22) Filed: Oct. 13, 2006

(65) Prior Publication Data

US 2007/0072068 A1    Mar. 29, 2007

Related U.S. Application Data

(62) Division of application No. 10/371,461, filed on Feb. 21, 2003, now abandoned.

(51) Int. Cl.
| | |
|---|---|
| *H01M 2/14* | (2006.01) |
| *H01M 2/16* | (2006.01) |
| *H01M 2/18* | (2006.01) |
| *H01M 10/0525* | (2010.01) |

(52) U.S. Cl.
CPC ..... *H01M 10/0525* (2013.01); *H01M 2/1653* (2013.01); *H01M 2/1673* (2013.01); *H01M 2/1686* (2013.01)

(58) Field of Classification Search
CPC .......................................... H01M 2/14–2/1693
USPC ........................... 429/10, 129–147, 247–255
See application file for complete search history.

(56) References Cited

U.S. PATENT DOCUMENTS

| 5,053,297 | A | * | 10/1991 | Yamahira et al. | 429/231.3 |
|---|---|---|---|---|---|
| 5,683,634 | A | * | 11/1997 | Fujii et al. | 264/41 |
| 5,948,557 | A | * | 9/1999 | Ondeck et al. | 429/33 |
| 6,200,706 | B1 | * | 3/2001 | Ashida et al. | 429/249 |
| 6,218,051 | B1 | | 4/2001 | Yokohata | |
| 7,138,207 | B2 | * | 11/2006 | Yamaguchi et al. | 429/144 |
| 2002/0055036 | A1 | | 5/2002 | Shinohara et al. | |
| 2002/0146626 | A1 | * | 10/2002 | Komatsu et al. | 429/246 |
| 2002/0197413 | A1 | * | 12/2002 | Daido | H01M 2/145 427/430.1 |

(Continued)

FOREIGN PATENT DOCUMENTS

| EP | 0823740 A1 | 2/1998 |
|---|---|---|
| EP | 1079456 A1 | 2/2001 |

(Continued)

OTHER PUBLICATIONS

Nishimura et al., Machine translation of JP 2000-82451 A, Mar. 2000.*

(Continued)

*Primary Examiner* — Sean P Cullen
(74) *Attorney, Agent, or Firm* — Hammer & Associates, P.C.

(57) ABSTRACT

A lithium ion rechargeable battery comprises: a negative electrode adapted to give up electrons during discharge, a positive electrode adapted to gain electrons during discharge, a microporous separator sandwiched between said positive electrode and said negative electrode, an organic electrolyte being contained within said separator and being in electrochemical communication with said positive electrode and said negative electrode, and an oxidative barrier interposed between said separator and said positive electrode, and thereby preventing oxidation of said separator.

4 Claims, 1 Drawing Sheet

(56) References Cited

U.S. PATENT DOCUMENTS

| | | | | |
|---|---|---|---|---|
| 2003/0005577 | A1* | 1/2003 | Kitano | H01M 10/0413 29/623.3 |
| 2003/0017386 | A1* | 1/2003 | Daido et al. | 429/142 |
| 2003/0022068 | A1* | 1/2003 | Pekala | 429/248 |
| 2003/0190523 | A1* | 10/2003 | Omaru | H01M 2/16 429/199 |
| 2005/0118510 | A1 | 6/2005 | Sano et al. | |

FOREIGN PATENT DOCUMENTS

| | | | |
|---|---|---|---|
| EP | 1153969 | A1 | 11/2001 |
| EP | 1184917 | A2 | 3/2002 |
| EP | 1202373 | A2 | 5/2002 |
| JP | 07096627 | B2 * | 10/1995 |
| JP | 10-100344 | | 4/1998 |
| JP | 10-106528 | | 4/1998 |
| JP | 2000082451 | A * | 3/2000 |
| JP | 2000-204174 | | 7/2000 |
| JP | 2001-151834 | | 7/2000 |
| JP | 2000251943 | A * | 9/2000 |
| JP | 2002-151044 | A | 5/2002 |
| JP | 2003-197172 | A | 7/2003 |
| WO | WO 0195421 | A1 * | 12/2001 |

OTHER PUBLICATIONS

Watanabe et al., Machine translation of JP 2000-251943, Sep. 2000.*
Ito et al., Machine translation of JP 07-096627 B2, Oct. 1995.*
Wikipedia contributors, "Redox," Wikipedia, The Free Encyclopedia, https://en.wikipedia.org/w/index.php?title=Redox&oldid=673709652 (accessed Jul. 31, 2015).*
Coating. Dictionary.com. Dictionary.com Unabridged. Random House, Inc. http://www.dictionary.com/browse/coating (accessed: May 18, 2016).*
English translation of Japanese Official Action dated Jan. 18, 2008.

* cited by examiner

OXIDATION RESISTANT SEPARATOR FOR A BATTERY

FIELD OF THE INVENTION

The invention is directed to reducing or preventing oxidation of the microporous membrane separator used in a rechargeable lithium-ion battery.

BACKGROUND OF THE INVENTION

Rechargeable (or secondary) lithium ion batteries (hereinafter lithium ion batteries) are commonly used today in, for example, hand held (cellular) telephones and laptop computers, among other things. Those lithium batteries are favored because of their high energy density, high voltage, and good charge retention. These batteries typically use a lithiated carbon material as the negative electrode, intercalation compounds, such as transition metal oxides (e.g., $Li_xCoO_2$), as the positive electrodes, microporous polyolefin membranes as the separator between the electrodes, and liquid electrolyte contained within the pores of the membrane and in electrochemical communication between the electrodes (reference to positive and negative is during discharge). Further detail on the materials of construction of these various components may be found in Linden, D., Editor, *Handbook of Batteries*, 2nd Edition, McGraw-Hill, Inc., New York, N.Y. 1995, pp. 36.1-36.77, and Besenhard, J. O., Editor, *Handbook of Battery Materials*, Wiley-VCH Verlag GmbH, Weinheim, Germany, 1999, for example pp. 47-55, each of which is incorporated herein by reference. These batteries are distinguished from so called "lithium polymer" batteries that are characterized by electrolytes that are in the form of a gel or solid, and consequently, have lower conductivities. Some such separators are described in Besenhard, J. O., *Ibid.*, pp. 557-558, incorporated herein by reference.

When the lithium ion battery is fully charged, the positive electrode (cathode) becomes a strong oxidizing agent because of its high positive valence, thereby creating at the positive electrode/separator interface a very tough environment for the battery components (electrodes, electrolytes, and separators). All these components are susceptible to degradation, via oxidation, in this environment.

Oxidation of the separator is undesirable. The separator serves several functions, one is to insulate the electrodes from one another, i.e., prevent internal shorting. This insulating function is accomplished by the use of polyolefin membranes. When a polyolefin separator is oxidized, it looses its physical and chemical integrity and is thus unsuitable for its original intended function. This shortens the useful life of the battery because the battery no longer can hold its charge due to internal shorting within the battery.

This oxidative environment at the positive electrode/separator interface may be more fully understood with reference to the following.

For example, a typical lithium ion battery may have: a positive electrode (cathode) containing lithium cobalt oxide, lithium nickel oxide, or lithium manganese oxide ($Li_xCoO_2$ will be discussed hereinafter); a negative electrode (anode) containing a lithiated carbon; a liquid electrolyte containing a lithium salt (e.g., $LiPF_6$ or $LiClO_4$) in an aprotic organic solvent (mixtures of EC, DEC, DMC, EMC, etc); and a microporous polyolefin membrane. During discharge, lithium ions migrate from the negative electrode (anode) containing the lithiated carbon to the positive electrode (cathode) containing $Li_xCoO_2$. The cobalt is reduced from a +4 valence to a +3 valence, and current is generated. During charging, current is supplied to the battery at a voltage in excess of the discharge voltage to move the lithium that migrated to positive electrode (cathode) back to negative electrode (anode), and the cobalt is oxidized from the +3 valence to the +4 valence state. In commercial batteries, a fully charged battery typically consists of about 75% of the cathodic active material (e.g., cobalt) to be at the +4 valence state and, if $Li_xCoO_2$ is used, x is about 3.5. In this state, the cobalt of the positive electrode (cathode) is a strong oxidizing agent. It can and will attack materials around it, particularly the separator.

Separator oxidation can be seen. FIG. 1 is a photograph of the magnified image of an oxidized separator. The separator is a microporous polyethylene membrane made by a 'wet' or 'phase inversion' process. This separator was recovered from a fully charged cell that had been stored in an oven (85° C.) for three days. The dark areas are the oxidized areas. FIG. 2 is a schematic illustration of the cross section of the membrane shown in FIG. 1. It is believed that these dark areas have less physical and chemical strength. Poor mechanical strength can lead to shorts and thus battery failure.

The foregoing oxidation problem is common. When batteries are stored in a fully charged condition, when batteries are stored, at temperatures greater than room temperatures, in a fully charged condition, or when batteries are charged at a constant voltage ~4.2V for an extended period of time, the oxidation problem arises. The latter situation is common, for example, when a laptop computer is left 'plugged in' and therefore continuously charging. In the future, the oxidation problem may become more severe. The current trend is for these batteries to be able to operate at temperatures greater than room temperature and for these to be stored, fully charged, at temperatures greater than room temperature. Therefore, oxidation at these greater potential temperatures will likely be more severe.

Accordingly, there is a need for batteries and separators that resist oxidation at the positive electrode (cathode)/separator interface of a lithium ion battery.

SUMMARY OF THE INVENTION

A lithium ion rechargeable battery comprises: a negative electrode adapted to give up electrons during discharge, a positive electrode adapted to gain electrons during discharge, a microporous separator sandwiched between said positive electrode and said negative electrode, an organic electrolyte being contained within said separator and being in electrochemical communication with said positive electrode and said negative electrode, and an oxidative barrier interposed between said separator and said positive electrode, and thereby preventing oxidation of said separator.

DESCRIPTION OF THE DRAWINGS

For the purpose of illustrating the invention, there is shown in the drawings a form that is presently preferred; it being understood, however, that this invention is not limited to the precise arrangements and instrumentalities shown.

DETAILED DESCRIPTION OF THE INVENTION

Figure 1:
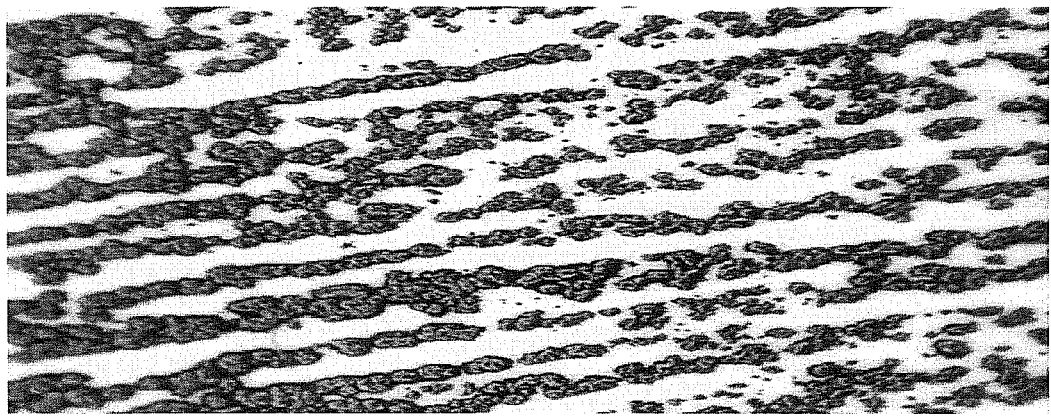
FIG. 1 is a photograph of an oxidized separator.
Figure 2:
FIG. 2 is a schematic illustration of the cross section of the separator shown in FIG. 1.

As discussed above, the battery is a rechargeable lithium ion battery. Such batteries are well known as is demonstrated by reference to Linden, *Handbook of Batteries*, 2nd Edition, McGraw-Hill, Inc., New York, N.Y., 1995, and Besenhard, *Handbook of Battery Materials*, Wiley-VCH Verlag GmbH, Weinheim, Germany, 1999, both incorporated herein by reference.

The rechargeable lithium ion battery referred to herein may be any rechargeable lithium ion battery. These batteries may be, for example, cylindrical, prismatic (rectangular), or pouch type gel polymer cells. Rechargeable lithium ion batteries with liquid electrolytes, however, are preferred. Liquid electrolytes are used to distinguish these batteries from lithium gel or polymer batteries that use gel or solid electrolytes. The batteries with liquid electrolytes are commercially available and include, but are not limited to, types 14500, 16530, 17500, 18650, 20500, 652248, 863448, 143448, and 40488.

The negative electrode adapted to give up electrons during discharge is any material conventionally used in a negative electrode in rechargeable lithium batteries. Such materials are lithium metal, lithium alloy, lithiated carbons, and transition metal compounds. For example, the lithium alloy may be LiAl. The lithiated carbons (intercalation of carbon) may be $Li_{0.5}C_6$ or $LiC_6$, where the carbon is, for example, coke or graphite. The transition metal compounds may be $LiWO_2$, $LiMoO_2$, $LiTiS_2$. The lithiated carbons are preferred.

The positive electrode adapted to gain electrons during discharge is any material conventionally used in a positive electrode in rechargeable lithium batteries. Such materials are characterized as having: high free energy of reaction with lithium, wide ability for intercalation, little structural change on reaction, highly reversible reaction, rapid diffusion of lithium in solid, good electronic conductivity, no solubility in electrolyte, and readily available or easily synthesized from low-cost materials. Such materials include, for example, $MoS_2$, $MnO_2$, $TiS_2$, $NbSe_3$, $LiCoO_2$, $LiNiO_2$, $LiMn_2O_4$, $V_6O_{13}$, $V_2O_5$. The preferred materials include $LiCoO_2$, $LiNiO_2$, $LiMn_2O_4$. The most preferred is $LiCoO_2$.

The microporous separator is sandwiched between the negative electrode and the positive electrode. These separators are typically made from polyolefins, but other film-forming polymer may be used. The polyolefins include polyethylene (including LDPE, LLDPE, HDPE, and UHM-WPE), polypropylene (PP), polymethyl pentene (PMP), polybutylene (PB), copolymer thereof, and mixtures of any of the foregoing. These separators may be made by either a dry stretch (Celgard) process or a wet (or phase inversion or extraction) process. Such separators are commercially available from Celgard Inc. of Charlotte, N.C., Tonen Chemical Corporation of Tokyo, Japan, Asahi Kasei Corp. of Tokyo, Japan, and Ube Industries of Tokyo, Japan. Such separators may be single layered or multi-layered. Single layered HDPE and UHMWPE separator and PP/PE/PP multi-layered separators are preferred.

The electrolyte may be any conventionally known electrolyte. Such electrolyte may be characterized by good ion conductivity ($>10^{-3}$ S/cm from −40 to 90° C.) to minimize internal resistance, a lithium ion transference number approaching unity, a wide electrochemical voltage window (0-5V), thermal stability, and compatibility with other cell components. Preferably, the electrolyte is a liquid organic electrolyte. The electrolyte comprises a solvent and a salt. The solvents (also known as aprotic solvents) may include, but are not limited to, butyrolacetone (BL), tetrahydrofuran (THF), dimethoxyethane (DME), propylene carbonate (PC), ethylene carbonate (EC), dimethyl carbonate (DMC), diethyl carbonate (DEC), diethoxyethane (DEE), ethyl methyl carbonate (EMC) and mixtures thereof. The salts may include, but are not limited to, $LiPF_6$, $LiAsF_6$, $LiCF_3SO_3$, $LiN(CF_3SO_2)_3$, $LiBF_6$, $LiClO_4$, and mixtures thereof. The preferred electrolytes include: $LiPF_6$ in EC/DEC; $LiBF_4$ in EC/DMC; and $LiPF_6$ in EC/EMC. The most preferred electrolytes include: $LiPF_6$ in EC/EMC and $LiBF_4$ in EC/EMC.

The present invention is directed to reducing or eliminating oxidation that occurs at the interface between the positive electrode and the separator. The reduction or elimination of oxidation that occurs at the interface between the positive electrode and the separator improves the cell's performance. Performance enhancements occur in cycle life characteristics, and shelf life characteristics at low and high voltages and at low and high temperatures, but especially at high temperatures (e.g., >35° C., especially >55° C. For this purpose, an antioxidative barrier is interposed between the separator and the positive electrode to prevent oxidation of the separator. Several such barriers, for example, are set out below.

The microporous separator may be made of a polymer that is resistant to oxidation, and that polymer must be in contact with the positive electrode. Here, the polymer of the separator is the antioxidative barrier, and it is integral with the separator. Such polymers include polypropylenes and halocarbons, e.g., polyvinylidene fluoride (PVDF), polytetrafluoro ethylene (PTFE), and copolymers of halocarbons. Such polymers must have a greater resistant to oxidation than polyethylene.

The separator may have a discrete polymer coating formed onto a separator, and that polymer coating must be in contact with the positive electrode. Here, the discrete polymer coating is the antioxidative barrier. Such polymer, as above, includes polypropylene, halocarbons, e.g., polyvinylidene fluoride (PVDF), polytetrafluoro ethylene (PTFE) and copolymers of halocarbons, and metal oxides, e.g., $Al_2O_3$ and $TiO_2$. In this solution, the coating is formed on any conventional separator, discussed above for example, by any conventional means. The coating may be very thin, e.g., one molecule thick, and should not impede the movement of ions across or through the separator. A coating of PVDF, for example, may be <0.4 mg/cm². Accordingly, the coating must be sufficiently thick to inhibit oxidation of the separator, but not so thick as to unduly inhibit ion flow across the separator (i.e., unduly increase internal resistance within the cell).

The positive electrode (cathode) may have a discrete polymer coating formed thereon, and that polymer coating must be in contact with the separator. Here, the discrete polymer coating is the antioxidative barrier. Such polymer, as above, includes polypropylene, halocarbons, e.g., polyvinylidene fluoride (PVDF), polytetrafluoro ethylene (PTFE) and copolymers of halocarbons, and metal oxides, e.g., $Al_2O_3$ and $TiO_2$. In this solution, the coating is formed on any positive electrode, discussed above for example, by any conventional means. The coating may be very thin, e.g., one molecule thick, and should not impede the movement of ions across or through the interface between the separator and the positive electrode. A coating of PVDF, for example, may be <0.4 mg/cm². Accordingly, the coating must be sufficiently thick to inhibit oxidation of the separator, but not so thick as to unduly inhibit ion flow (i.e., unduly increase internal resistance within the cell).

The microporous separator may include antioxidants in the polymeric material. These antioxidants may be dispersed throughout the polymeric material forming the separator, but preferably it should be concentrated at the face of the separator that will be juxtaposed to the positive electrode, to maximize the efficacy of the antioxidant. Antioxidants are routinely added to polymers prior to processing. These antioxidants protect the polymer during the rigors of processing (e.g., extrusion, typically melt extrusion), as well as, subsequently during use, that is exposure to the atmosphere. Those antioxidants may be useful in protecting the separator from the instant problem, but the initial concentration of antioxidant added before processing should be increased significantly. The significant increase (perhaps, greater than 100 times) is needed because during processing 70-80% of the antioxidant conventionally added to the polymer is sacrificed to protect the polymer. Thus an insufficient amount is left after processing to adequately protect the separator. Accordingly, if the conventional addition rate for a particular antioxidant was 0.01-0.1% by weight of the polymer, then with the instant invention, the addition rate may be increased to 1-10% by weight. Of course, the antioxidant should be present in an amount sufficient to inhibit oxidation of the separator at the interface between the positive electrode and the separator. An additional consideration is that the antioxidant should not be soluble in the electrolyte. Such antioxidants include, but are not limited to, for example: phenols; phosphorous containing compounds (phosphates, phosphonites); and sulfur containing compounds (thiosynergists). Examples of such antioxidants include, but are not limited to, IRGANOX 1010, IRGAFOS 168, IRGANOX B-125, and IRGANOX MD 1-24, each commercially available from Ciba-Geigy Corporation of Cranberry, N.J. The use of antioxidants is preferred when the polymeric material is polyethylene (including LLDPE, LDPE, HDPE, and UHMWPE).

The separator may have a discrete antioxidant coating formed thereon, and that coating must be in contact with the positive electrode. The coating is, preferably, very thin, i.e., should not impede the movement of ions across or through the interface between the separator and the positive electrode, and protects the mechanical integrity of the separator by suppressing oxidative degradation. The coating may be applied by any conventional coating method including, for example, brushing, spraying, via roller, or immersion. Of course, the antioxidant should be present in an amount sufficient to inhibit oxidation of the separator at the interface between the positive electrode and the separator. Like above, these antioxidants should not be soluble in the electrolyte. Such antioxidants include, but are not limited to, for example: phenols; phosphorous containing compounds (phosphates, phosphonites); and sulfur containing compounds (thiosynergists). Examples of such antioxidants include, but are not limited to, IRGANOX 1010, IRGAFOS 168, IRGANOX B-125, and IRGANOX MD 1-24, each commercially available from Ciba-Geigy Corporation of Cranberry, N.J. The use of antioxidants is preferred when the polymeric material is polyethylene (including LLDPE, LDPE, HDPE, and UHMWPE).

The positive electrode may have a discrete antioxidant coating formed thereon, and that coating must be in contact with the separator. The coating is, preferably, very thin, i.e., should not impede the movement of ions across or through the interface between the separator and the positive electrode, and protects the mechanical integrity of the separator by suppressing oxidative degradation. The coating may be applied by any conventional coating method including, for example, brushing, spraying, via roller, or immersion. Of course, the antioxidant should be present in an amount sufficient to inhibit oxidation of the separator at the interface between the positive electrode and the separator. Like above, these antioxidants should not be soluble in the electrolyte. Such antioxidants include, but are not limited to, for example: phenols; phosphorous containing compounds (phosphates, phosphonites); and sulfur containing compounds (thiosynergists). Examples of such antioxidants include, but are not limited to, IRGANOX 1010, IRGAFOS 168, IRGANOX B-125, and IRGANOX MD 1-24, each commercially available from Ciba-Geigy Corporation of Cranberry, N.J. The use of antioxidants is preferred when the polymeric material is polyethylene (including LLDPE, LDPE, HDPE, and UHMWPE).

The present invention may be embodied in other forms without departing from the spirit and the essential attributes thereof, and, accordingly, reference should be made to the appended claims, rather than to the foregoing specification, as indicated the scope of the invention.

That which is claimed:

1. A method for preventing oxidation on a polyolefin separator in a lithium ion secondary battery comprising the steps of:
    providing a lithium ion secondary battery having a positive electrode and a polyolefin separator film, the separator film consisting of a polyolefin film and an antioxidative barrier coating on the polyolefin film, where the coating is only on a side of the polyolefin film and facing the positive electrode; and
    positioning said antioxidative barrier coating between the positive electrode and said polyolefin film, the antioxidative barrier coating being made of a polymer having a resistance to oxidation greater than polyethylene, where said antioxidative barrier coating consists of polyvinylidene fluoride, where said polyolefin film is a polyethylene film, and
    wherein said antioxidative barrier coating has a weight of <0.15 mg/cm$^2$.

2. The method of claim 1 where said polyolefin film is a single layered film.

3. The method of claim 1 where said polyolefin film is a multi-layered film.

4. The method of claim 1 where said antioxidative barrier coating is a discrete polymer coating formed onto said polyolefin film by a coating method selected from the group consisting of brushing, spaying, applying via roller, and applying by immersion.

* * * * *